UNITED STATES PATENT OFFICE.

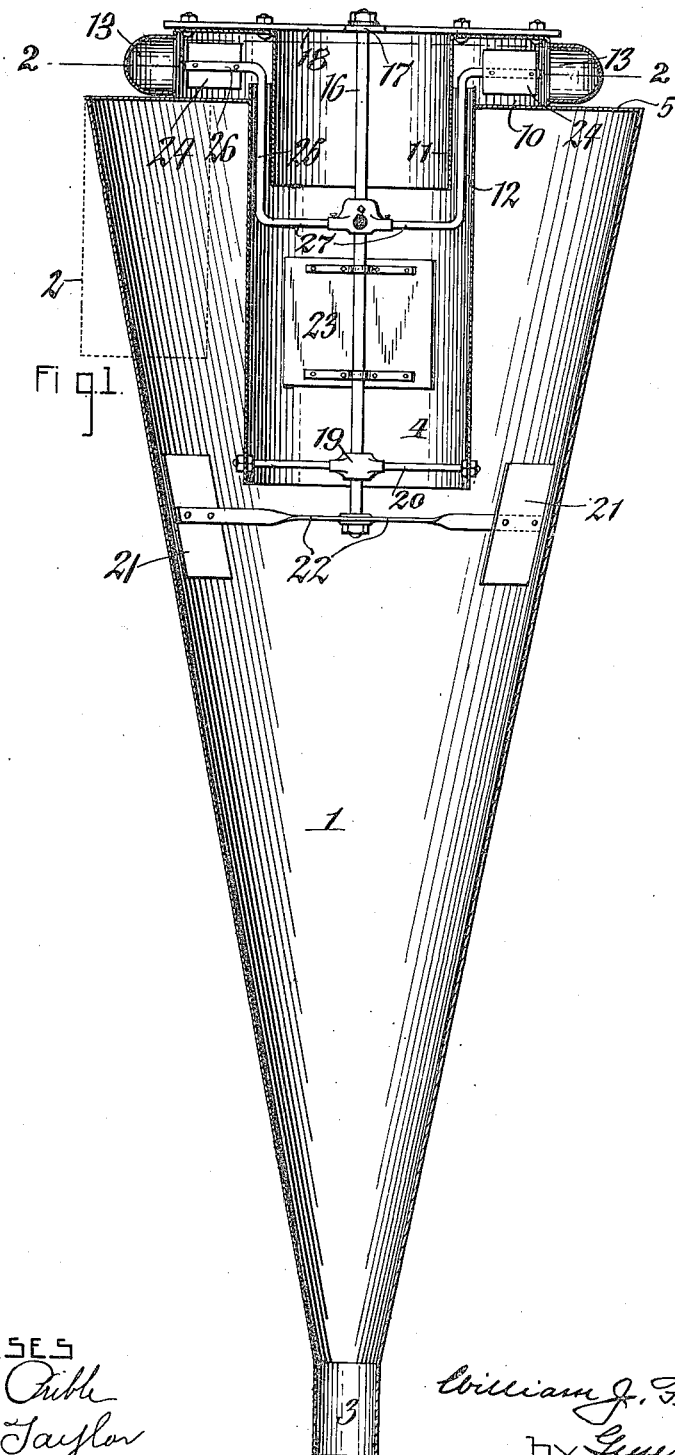

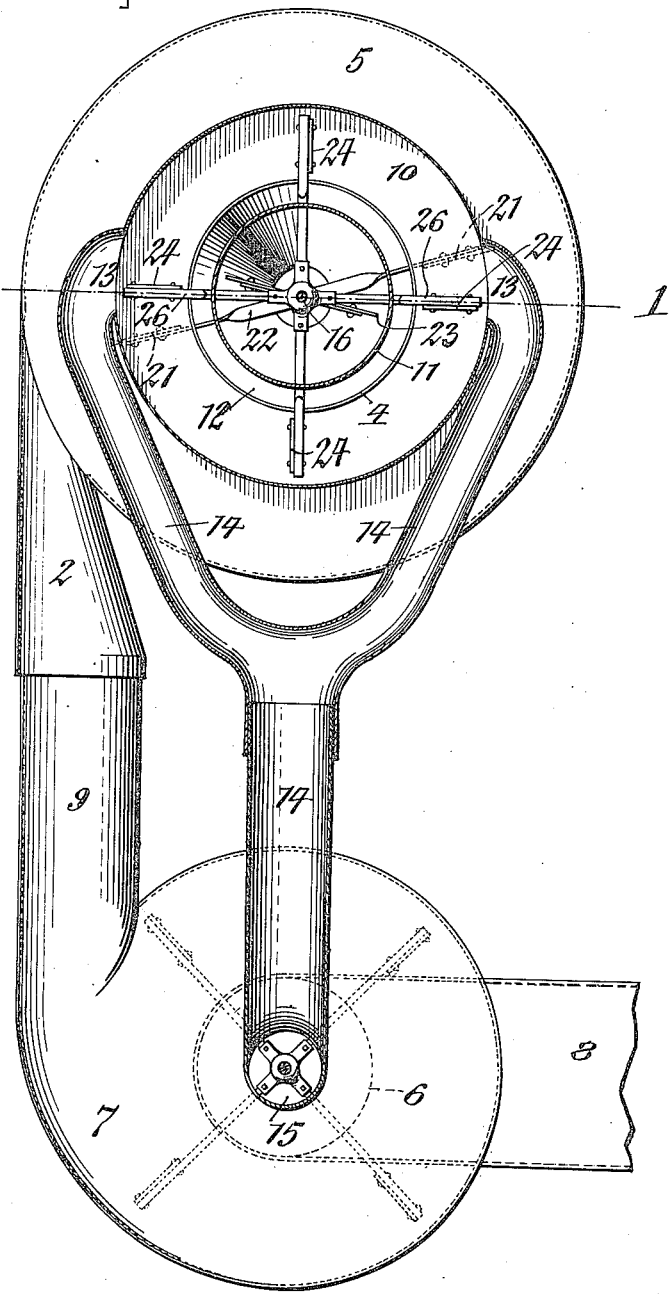

WILLIAM J. FENDER, OF SILVER CREEK, NEW YORK, ASSIGNOR OF ONE-HALF TO JOHN G. HINTZ, OF MILWAUKEE, WISCONSIN.

DUST-COLLECTOR.

1,165,401.  Specification of Letters Patent.  Patented Dec. 28, 1915.

Application filed October 29, 1914. Serial No. 869,189.

*To all whom it may concern:*

Be it known that I, WILLIAM J. FENDER, a citizen of the United States, residing at Silver Creek, in the county of Chautauqua and State of New York, have invented new and useful Improvements in Dust - Collectors, of which the following is a specification.

This invention relates to dust collectors of the type in which the separation of the dust from the dust laden air is effected by a whirling motion of the latter in a separating chamber. In such machines, as heretofore constructed, some of the light solid particles suspended in the air usually escaped through the outlet of the machine in the form of smoke, so called, which is not only objectionable on account of the loss of the solid constituents, in the case of flour, but also on account of the danger of explosion which is liable to result from an accumulation of such light solid particles in the atmosphere of the building.

It is the object of this invention to provide simple and inexpensive means whereby such light particles or dust passing through the outlet of the machine are withdrawn therefrom, and preferably repeatedly subjected to the separating action of the machine so that such air which escapes from the machine to the surrounding atmosphere is practically free from dust.

In the accompanying drawings: Figure 1 is a vertical section of a dust collector embodying my improvements. Fig. 2 is a horizontal section of the same taken in line 2—2, Fig. 1.

Similar characters of reference indicate corresponding parts in both views.

1 represents the main separating chamber which is preferably constructed of downwardly tapering form and in which the dust laden air assumes a whirling, gyrating or rotative motion for the purpose of separating the dust or solid particles contained in the air. The dust laden air is introduced into the upper or large end of the main separating chamber through an inlet 2 which opens tangentially into the main separating chamber. The dust or fine particles of solid matter escapes through an outlet 3 at the small or lower end of the main separating chamber and the separated or purified air escapes through an outlet in the upper or large end of the main separating chamber, this last mentioned outlet being preferably formed by means which comprise a main air outlet tube 4 which is arranged axially within the main separating chamber and projects downwardly from the head 5 at the upper end thereof, as shown in Fig. 1. The air may be supplied to the inlet of the main separating chamber from the source where the same is generated by any suitable means, for instance, by the means which are shown in the drawings and which comprises a fan having one eye 6 of its case 7 connected by a supply spout 8 with the place from whence the dust is drawn and having its outlet or discharge spout 9 connected with the inlet 2 of the main separating chamber. As the dust laden air is blown or forced through the tangential inlet into the main separating chamber the same assumes a whirling, rotating or gyrating motion about the axis of the separating chamber, whereby the solid matter contained in the air is separated therefrom by being thrown against the wall of the separating chamber and the purified air gathers in the vortex of this whirling body. The separated dust gradually moves downwardly along the tapering wall of the main separating chamber and escapes through the outlet at the small end thereof while the purified air passes upwardly from the center of the separating chamber through the air outlet of which the main tube forms a part.

It has been found in practice that when treating dust laden air which contains exceedingly fine or light dust particles that such dust or particles are liable to pass out through the outlet of the main separating chamber in the form of smoke. This smoke formed by the fine particles of flour contained in the air escaping from the machine, as commonly occurs in flouring mills, is not only a distinct loss to the miller on account of the valuable constituents in this dust but the escape of the same into the building is also very dangerous on account of its explosive character which has often wrecked buildings upon being ignited. In order therefore to remove all traces of dust or fine particles of flour which may still remain in the air which ordinarily escapes from the separating chamber and before the same reaches the outer atmosphere, the following means are provided which are constructed in accordance with my invention.

10 represents a supplementary chamber or case arranged above the top or large end of the main separating chamber, and 11 a supplementary outlet tube extending from the top of the supplementary chamber downwardly into the upper end of the main air outlet tube and opening at its lower end into the latter while its upper end opens into the outer atmosphere. The supplementary air outlet tube is of smaller diameter than the main air outlet tube, so as to form an annular skimming passage or conduit 12 between these tubes which places the interior of the main air outlet tube in communication with the interior of the supplementary chamber. At one or more points of its periphery the supplementary chamber is provided with one or more outlets 13, preferably two in number, as shown in the drawings, which outlets may lead to any suitable place where it is safe to conduct the fine dust particles or smoke contained in the air issuing from the main separating chamber, or these outlets may deliver the air containing the fine dust particles to another machine which further operates upon the air with a view of abstracting therefrom all traces of dust and either recovering the same, if valuable, or otherwise disposing of the same to prevent dangerous conditions. It is preferable, however, to connect the outlets of the supplementary chamber by means of a forked or bifurcated piping or conduit 14 with the other eye 15 of the fan case 7 which originally delivers the main supply of dust laden air to the machine, as shown in Fig. 2.

Axially within the main separating chamber and the main and supplementary air tubes is arranged an upright operating shaft 16 which may be driven and rotatably supported in any suitable manner. The drawings show one of many ways in which the shaft may be mounted and as there shown the upper end of this shaft is journaled in the bearing 17 mounted on a cross bar or bridge 18 secured to the top of the supplementary chamber and extending across the upper end of the supplementary tube while the lower part of this shaft is journaled in a bearing 19 which is mounted on a cross bar or bridge 20 arranged within the lower part of the main air outlet tube and secured at its opposite ends thereto. Although the shaft may be turned by various means it is preferable to employ for this purpose motor blades 21 which are arranged within the main separating chamber adjacent to the wall thereof and connected by means of arms 22 with the lower end of the shaft. As the dust laden air whirls around the interior of the main separating chamber the pressure of this air operating against the blades 21 causes the same to be carried around with the air whereby the same forms a motor for turning the shaft 16 and the parts mounted thereon. Within the main air outlet tube and below the supplementary air outlet tube is arranged a spreader or dasher 23 which operates to throw any solid light matter contained in the air within the main air outlet tube against the bore or outer layer of this body or stream of air as the same moves upwardly through this tube leaving the central part of this upwardly moving stream comparatively pure and free from dust or light particles of solid matter as the same escapes upwardly through the supplementary air outlet tube to the outer atmosphere. The outermost layer of the stream of air passing upwardly through the lower part of the main air outlet tube is skimmed off or separated from the inner part of this stream by means of the supplementary air outlet tube and this skimmed off outer portion of the air passes from the lower part of the main air outlet tube through the annular skimming passage into the supplementary chamber. Dust is prevented from accumulating in and clogging the skimming passage 12 and the interior of the supplementary chamber by a clearing or agitating device which preferably comprises one or more rotatable agitating or clearing blades 24 which are arranged within the supplementary chamber and rotate about the axis thereof between the wall of this chamber and the supplementary air outlet tube. These clearing blades 24 preferably derive their motion from the shaft 16 which is driven by the motor blades 21 and for this purpose each of the clearing blades 24 is connected with the shaft by means of an angular arm having an upright portion 25 which is arranged within the vertical skimming passage, an upper horizontal portion 26 projecting outwardly from the upper end of the vertical portion and connected with one of the fan blades 24 and a lower horizontal portion 27 projecting inwardly from the lower end of the vertical portion and connected with the shaft 16, as shown in Fig. 1. As the shaft is rotated by the motor blades the clearing blades 24 and their supporting arms are also rotated and keep the supplementary chamber and skimming passage free from obstructions which might be caused by accumulations of dust therein. The outer layer of air and the fine particles of dust contained therein which are thus withdrawn from the main air outlet tube and delivered into the supplementary chamber are withdrawn from the latter through the outlets 13 thereof into the eye 15 of the main fan case 7 from which latter they are again discharged through the delivery spout thereof into the main separating chamber where this dust laden air which has been withdrawn from the outer layer in the main outlet tube is again subjected to the separating action which takes place by whirling the body of dust laden air within the main separating chamber. The dust laden air is thus returned continuously from the outlet of the main separating chamber to the inlet thereof and kept constantly in circulation through the machine in this manner until practically all of the fine as well as the coarse particles of dust are removed from the air and the latter is permitted to escape to the outer atmosphere in a practically pure condition.

These improvements are comparatively simple and compact in construction so that no greater amount of room is required than that commonly required for machines of this type heretofore in use. Owing to the fact that this machine is self contained and provides its own power for operating the movable parts within the machine, the same can be very readily installed and no expense is involved for operating and maintaining the movable parts. Furthermore, my improvements contain no delicate parts which are liable to get out of order and the working parts do not encroach to any material extent upon the internal spaces of the machine, whereby an increased efficiency of the machine is secured without sacrificing its capacity.

I claim as my invention:

1. A dust collector comprising a main separating chamber in which the dust laden air assumes a whirling motion and which is provided with an inlet for the dust laden air, an outlet for the separated dust, a main outlet for the purified air, a supplementary chamber connected by a skimming passage with the peripheral part of said main outlet, movable means arranged in said skimming passage and in said supplementary chamber and operating to keep said skimming passage and supplementary chamber clear of obstructions, and means for withdrawing the dust laden air from said supplementary chamber and discharging the same into the inlet of said main separating chamber.

2. A dust collector comprising a main separating chamber in which the dust laden air assumes a whirling motion and which is provided with an inlet for the dust laden air, a main outlet for the separated air and an outlet for the separated dust, a supplementary chamber having an outlet and an inlet which communicates with the outer zone of said air outlet passage, a shaft arranged in said main air outlet and main chamber, a spreader arranged on said shaft within said main air outlet, motor blades arranged in said main chamber and mounted on said shaft, and clearing blades arranged within said supplementary chamber and mounted on said shaft.

3. A dust collector comprising a main tapering separating chamber in which the dust laden air assumes a whirling motion and which is provided at its large end with a tangential inlet for the dust laden air, an outlet for the separated dust at its small end and a main outlet tube arranged axially at its large end, a supplementary chamber arranged above the large end of the main chamber and having an outlet and provided centrally with a supplementary outlet or skimming tube which is arranged within the outer part of said main outlet tube but separated from the latter by an intervening skimming passage which connects the interior of the supplementary chamber with the interior of said main outlet tube, a shaft arranged lengthwise within the main chamber and the main and supplementary outlet tubes, a rotatable spreader mounted on the shaft within the main outlet tube, motor blades mounted on the shaft within the main chamber, and clearing blades arranged in said supplementary chamber and mounted on said shaft.

4. A dust collector comprising a main tapering separating chamber in which the dust laden air assumes a whirling motion and which is provided at its large end with a tangential inlet for the dust laden air, an outlet for the separated dust at its small end and a main outlet tube arranged axially at its large end, a supplementary chamber arranged above the large end of the main chamber and having an outlet and provided centrally with a supplementary outlet or skimming tube which is arranged within the outer part of said main outlet tube but separated from the latter by an intervening skimming passage which connects the interior of the supplementary chamber with the interior of said main outlet tube, a shaft arranged lengthwise within the main chamber and the main and supplementary outlet tubes, a rotatable spreader mounted on the shaft within the main outlet tube, motor blades mounted on the shaft within the main chamber, clearing blades arranged in said supplementary chamber, and arms connecting said clearing blades and shaft and arranged in the annular space between said main and supplementary outlet tubes.

5. A dust collector comprising a main tapering separating chamber in which the dust laden air assumes a whirling motion and which is provided at its large end with a tangential inlet for the dust laden air, an outlet for the separated dust at its small end and a main outlet tube arranged axially at its large end, a supplementary chamber arranged above the large end of the main chamber and having an outlet and provided centrally with a supplementary outlet or skimming tube which is arranged within the outer part of said main outlet tube but separated from the latter by an intervening skimming passage which connects the interior of the supplementary chamber with the interior of said main outlet tube, a shaft arranged lengthwise within the main chamber and the main and supplementary outlet tubes, a rotatable spreader mounted on the shaft within the main outlet tube, motor blades mounted on the shaft within the main chamber, clearing blades arranged in said supplementary chamber, and a circulating fan having its eye connected with the outlet of said supplementary chamber and its spout connected with the inlet of said main chamber.

6. A dust collector comprising a main tapering separating chamber in which the dust laden air assumes a whirling motion and which is provided at its large end with a tangential inlet for the dust laden air, an outlet for the separated dust at its small end and a main outlet tube arranged axially at its large end, a supplementary chamber arranged above the large end of the main chamber and having outlets on its diametrically opposite sides provided centrally with a supplementary outlet or skimming tube which is arranged within the outer part of said main outlet tube but separated from the latter by an intervening skimming passage which connects the interior of the supplementary chamber with the interior of said main outlet tube, a shaft arranged lengthwise within the main chamber and the main and supplementary outlet tubes, a rotatable spreader mounted on the shaft within the main outlet tube, motor blades mounted on the shaft within the main chamber, clearing blades arranged in said supplementary chamber and mounted on said shaft, a circulating fan, a forked pipe connecting the outlets of said supplementary chamber with the eye of said circulating fan, and a pipe connecting the spout of said circulating fan with the inlet of said main chamber.

Witness my hand this 24th day of October, 1914.

WILLIAM J. FENDER.

Witnesses:
JOHN G. HINTZ,
THEO. L. POPP.